United States Patent [19]
Washbourn

[11] 3,731,983
[45] May 8, 1973

[54] BRAKE CONTROL VALVE APPARATUS

[75] Inventor: Jack Washbourn, London, England

[73] Assignee: Westinghouse Brake and Signal Company Limited, London, England

[22] Filed: Sept. 24, 1971

[21] Appl. No.: 183,408

[30] Foreign Application Priority Data

Oct. 16, 1970 Great Britain.....................49,178/70

[52] U.S. Cl.........................................303/33, 303/66
[51] Int. Cl................................................B60t 15/18
[58] Field of Search.....................303/33, 59, 60, 66

[56] References Cited
UNITED STATES PATENTS 3,472,561  10/1969  Washbourn.........................303/33

Primary Examiner—Duane A. Reger
Attorney—Larson, Taylor & Hinds

[57] ABSTRACT

A fluid operable triple valve for brake control means in which stability in the brake-applied equilibrium or lap position on the one hand and stability in the released position on the other hand are each provided by a spring acting to opposed movement of the pressure responsive diaphragm of the valve and fluid operable means being provided to remove the action of the spring in each case as soon as its thrust has been overcome by the pressure differential across the diaphragm.

7 Claims, 1 Drawing Figure

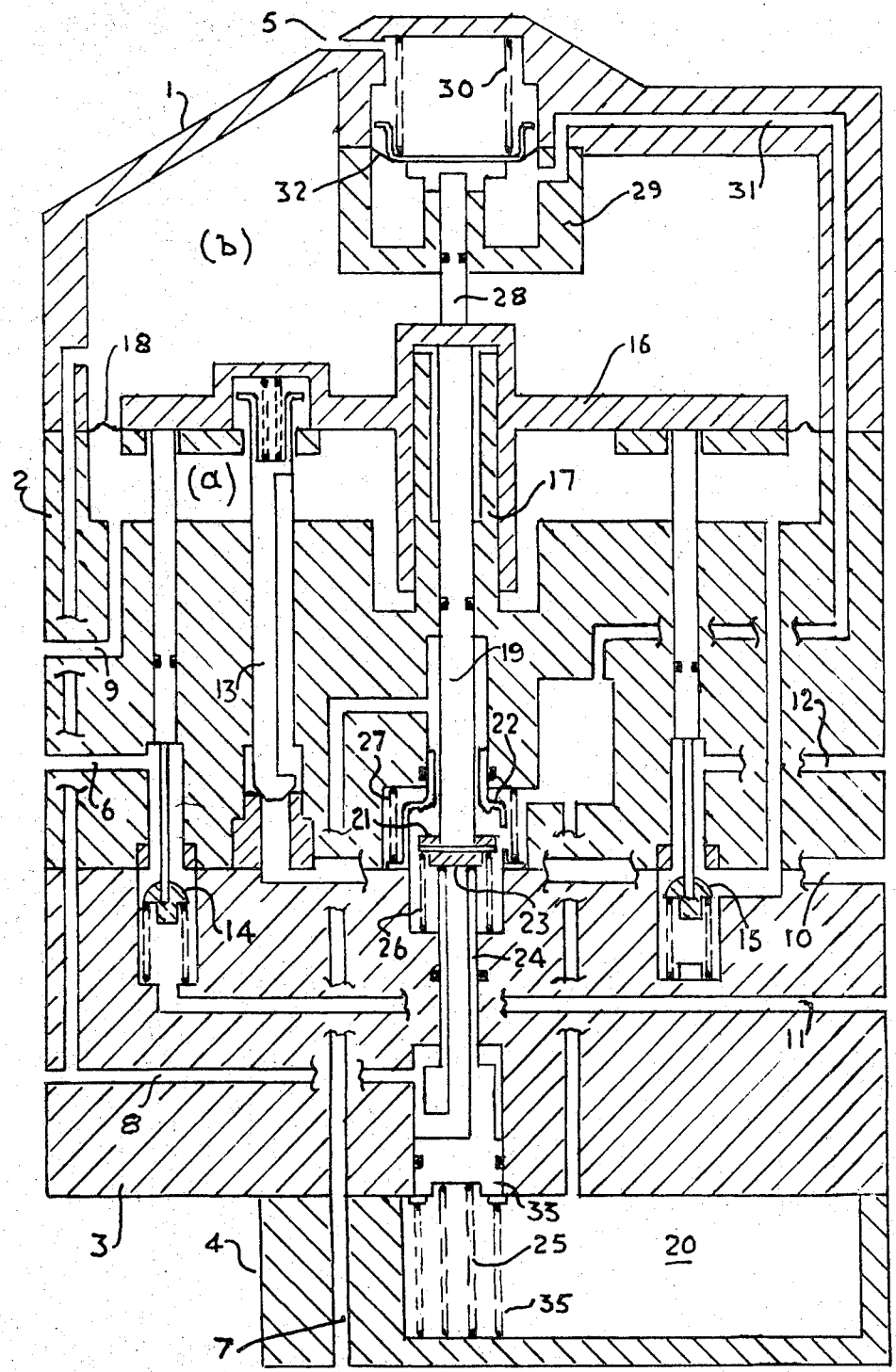

BRAKE CONTROL VALVE APPARATUS

This invention relates to brake control valve apparatus and relates particularly to aspects of such apparatus for affording stability in so-called lap and/or release positions of the valve apparatus.

It has been previously proposed to provide a triple valve operable in response to a difference between a pressure in a brake pipe and the pressure in an auxiliary reservoir to displace a pressure responsive member to operate valves for applying braking pressure from the auxiliary reservoir into a brake cylinder. Quick service in a braking application may be achieved as described in the specification of co-pending application No. 13301/70 by providing a quick service bulb capacity into which brake pipe pressure is rapidly dropped on initiation of a brake application. Following initiation of such a brake application, auxiliary reservoir pressure can descend due to dissipation thereof into the brake cylinder until a value is reached at which the pressure responsive member returns towards a lap position and stability in such a lap position may be achieved in the apparatus described in the above numbered co-pending application by virtue of quick service bulb pressure acting on the area of a quick service bulb exhaust valve.

Where stability in the lap position that is a position of equilibrium with a brake pressure applied, is achieved in the manner indicated above, it will be appreciated that the stability is dependent upon the system pressure. Thus, according to the recharged value of pressures in the valve apparatus, so the stability may vary.

In an apparatus such as referred to above moreover stability of the pressure responsive member in the release position of the apparatus, that is the position of equilibrium when no brake pressure is applied, may be achieved as described above in the quoted Specification by virtue of a differential area of the pressure responsive member afforded by a stem upon the area of which, brake pipe pressure acts in the release position to afford a thrust on the pressure responsive member to provide stability. Again, if the recharged value of brake pipe pressure varies, so the stability of the apparatus may also vary.

Such variation may be of significance where brake pipe pressures vary from one system to another with which it is required to be compatible and where even in a given system higher brake pipe pressures may be specified according to the type of service. For example, higher brake pipe pressures may be specified for mountainous areas to afford greater braking.

It will be appreciated moreover that where such valve apparatus is employed at repeated locations along a train, and control of these is afforded by a common brake pipe, the initiation of a brake application may vary not only as a result of the finite propagation time for brake pipe variations down the train but also as a result of variations in the stabilities in the lap and or release equilibrium positions between one valve apparatus and another. Clearly this is not desirable.

According to the present invention there is provided fluid operable brake control valve apparatus having brake cylinder inlet and exhaust valves for controlling the supply of fluid pressure into and out of a brake cylinder, said valves being operable by a pressure responsive member movable in response to changes of pressure applied to a brake pipe relative to an auxiliary reservoir pressure to apply via the brake cylinder inlet valve fluid pressure from the auxiliary reservoir to the brake cylinder, resilient means operable to offer a predetermined force to the pressure responsive means in a sense to oppose displacement thereof from one of its equilibrium positions in response to a change in pressure differential across the pressure responsive means and conditioning means responsive to displacement of the pressure responsive means against the resilient means for removing the said force exerted by the resilient means.

In order that the present invention may be more clearly understood and readily carried into effect, the same will be further described by way of example with reference to the single FIGURE of the accompanying drawing which illustrates in schematic form a brake control valve apparatus and shows the main parts thereof requiring consideration for the purposes of the present disclosure. The apparatus comprises a main casting comprised of four principal parts denoted by references 1, 2, 3 and 4. The housing provided thereby is arranged to incorporate a number of exhaust ports these being denoted by reference 5, 6 and 7 a brake pipe is connected to a port 8 and an auxiliary reservoir is assumed connected to a port 9. The brake cylinder to which the apparatus is arranged to apply and remove braking pressure is connected to ports 10 and 11 for application and release respectively. A further port 12 is also provided which derives pressure indirectly from the brake pipe for the purposes of charging the auxiliary reservoir.

Three principal valves are included in the apparatus and these consist of the brake cylinder inlet valve 13, the brake cylinder exhaust valve 14 and the auxiliary reservoir charging valve 15. These valves are operated by a main pressure responsive member denoted by reference 16 mounted between the portions 1 and 2 to be movable on a stem within the range of movement afforded by a diaphragm 18 which separates the chambers above and below the member 16. In addition to controlling the brake cylinder inlet valve exhaust valve and auxiliary reservoir charging valve as aforementioned, the pressure responsive member 16 is coupled via a valve stem 19 to a quick service bulb inlet and exhaust valve arrangement via which the brake pipe is connectable to the quick service bulb chamber 20. The stem 19 therefore carries at its lower end a valve member 21 associated with which there is a sealingly slidable valve seat 22 and also a valve member 23 associated with which there is a further sealingly slidable valve seat 24. The valve seat 24 has at its lower end a piston 33 being a pressure responsive device operable by the resultant thrust thereon afforded by the resilient means in the forms of a spring 25 and the brake pipe and quick service bulb pressures. As will be seen hereafter, the spring 25 affords stability in the lap position of the apparatus and this stability is largely independent of the system pressures. It is significant moreover, that for movement of the pressure responsive member 16 towards a release position for the brakes the force of the spring 25 is removed from the mechanical system of forces. The valve members 21 and 23 and the slidable valve seat 22 have associated light springs represented by references 26 and 27.

Mounted above the main pressure responsive member 16 there is a thrust rod represented by reference 28 slidable in an auxiliary housing 29 and bearing on the upper surface of the pressure responsive member 16. The rod 28 is urged downwards by the force of a further resilient means in the form of a housed spring 30. The thrust of this spring is relievable only by pressure derived via a fluid pressure passage 31 from the quick service bulb capacity to deflect an auxiliary pressure responsive means in the form of a diaphragm 32 upwards to compress the spring 30. As will be seen hereafter, the spring 30 largely provides for stability of the apparatus in the release position such that this stability is also largely independent of the system pressures and yet the spring 30 is effectively removed from the system immediately following a brake application.

Referring now to the operation of the apparatus, it may be assumed initially that prior to a brake application the pressure in the chamber b above the pressure responsive member 16 is substantially equal to the pressure in the chamber a beneath the pressure responsive member 16. The pressure in chamber b is brake pipe pressure applied from the port 8 and the pressure in chamber a is auxiliary reservoir pressure which as indicated above is derived from the brake pipe during the recharging process. In order to achieve a brake application, the brake pipe pressure is reduced a predetermined amount sufficient to cause a small deflection of the spring 30 and thereby overcome the release stability, whereupon the valve 23 raises from its seat 24 to permit brake pipe pressure to enter the bulb capacity 20. Brake pipe pressure is therefore transmitted via the bulb inlet valve to the pressure responsive device 32 to remove the force of spring 30. This with the rapid reduction of brake pipe pressure allows rapid movement in the upward direction of the pressure responsive member 16. This has the effect of closing the auxiliary reservoir charging valve 15, closing the brake cylinder exhaust valve 14 and opening the brake cylinder inlet valve 13 to connect auxiliary reservoir pressure to the brake cylinder via port 10. Thereupon a reduction of auxiliary reservoir pressure occurs into the brake cylinder until a point is reached at which the auxiliary reservoir pressure has fallen to near brake pipe pressure and the pressure responsive member moves into a lap position where the valve 21 is closed, and valve 23 is able to move against its seat 24. This is because soon after the opening of the quick service valve just referred to, the pressure increase in 20 the spring 25 to overcome the previously restraining pressure above piston 33 and 33 will therefore have moved upwards to its upper stop. Accordingly when the system laps off, the valve seat 24 is in its upper position. The valve laps off with brake cylinder inlet and exhaust valves closed and the resistance of bulb pressure on the area of valve seat 23 affords initial stability. In its turn the seat 24 is urged upwards by the thrust in the spring 25 to afford a fixed element of stability when brake pipe pressure fluctuation causes the assembly to move down to close off seat 24. When any brake pipe fluctuations settle out the assembly returns to a position in which valve 23 is open, it being in the present instance essential for other functions of the valve that a connection be maintained between bulb and brake pipe whilst the brake is applied. Accordingly, a fixed element of stability in the lap position is afforded by the thrust in spring 25 and is aided less significantly by the quick service bulb pressure which is exerted over the relatively insignificant differential area afforded by the valve seat 21 in the closed position against its sliding sleeve 22.

It will be recalled that on the rapid increase of pressure in the quick service bulb capacity from the brake pipe, this pressure is transmitted via the passage into the region beneath the auxiliary pressure responsive member afforded by the diaphragm 32 to rapidly compress the spring 30 thereby removing the thrust thereof from the system for operation after movement from the release position. The spring 30 therefore merely affords stability in the release position only to return to a position in which the rod 28 engages with 16 in the event of return to the release condition.

In order to effect release, the pressure in the brake pipe 8 is raised to an extent which produces such a difference of pressure between the chamber b and the chamber a that the lap stability afforded by the spring 25 is overcome and the stem 19 and the whole assembly descends towards a point at which the sleeve 22 engages with its lower stop and the valve member 21 separates from its seat and bulb capacity is exhausted to atmosphere via the passage 7. The pressure in the chamber 20 therefore descends and the stem 19 acts via 21, 23 and 24 to thrust the piston 33 to its lowermost position against its housed reaction spring 35 and the system returns to its initial position with the pressure removed from the passage 31 to return the spring 30 to afford the release stability. Also, the predominance of brake pipe pressure in 8 over atmospheric pressure in 20 causes the pressure responsive piston 33 to remove the force of spring 25 from the system affecting the movement of the main pressure responsive means 16 for a subsequent new application of the brakes.

During the descent of the pressure responsive members 16 together with the stem 19 and sliding sleeve 24 to the lowermost position, the brake cylinder exhaust valve is reopened along with the auxiliary reservoir charging valve 13. Accordingly, the system returns to its initial condition in readiness for a further brake application.

It will be appreciated that by virtue of the springs 25 and 30 and suitable selection of the areas provided which are subjected to differential pressures in the lap and release positions of the apparatus, the stabilities of the apparatus in these positions can be largely independent of the system pressures and therefore it is possible to operate apparatus such as described along side or in the same system as similar apparatus operating with different pressures without the risk of the variation in stabilities being such as to cause difficulties in operation.

Having thus described our invention what we claim is:

1. Fluid operable brake control valve apparatus having brake cylinder inlet and exhaust valves for controlling the supply of fluid pressure into and out of a brake cylinder, pressure responsive means for operating said valves, means rendering said pressure responsive means movable in response to changes of pressure applied to a brake pipe relative to an auxiliary reservoir pressure to apply, via the brake cylinder inlet valve, fluid pressure from the auxiliary reservoir to the brake cylinder, resilient means for exerting a predetermined force on said pressure responsive means in a sense to oppose displacement thereof from one of its equilibrium positions upon a change in pressure differential across said pressure responsive means, and conditioning means responsive to displacement of the pressure responsive means against the resilient means for removing the said force exerted by the resilient means.

2. Fluid operable brake control valve apparatus as claimed in claim 1, wherein said resilient means comprise respective resilient means for exerting a predetermined force to the pressure responsive means in a sense to oppose displacement thereof on the one hand from a release equilibrium position and on the other hand from a lap equilibrium position, together with respective said conditioning means for removing the forces.

3. Fluid operable brake control valve apparatus as claimed in claim 1 wherein said resilient means exerts a said predetermined force on the pressure responsive means against movement from the lap equilibrium position towards a release position, and including a spring which is compressible by a first pressure responsive device subject to brake pipe pressure to hold its force removed from the pressure responsive member for movement onto the release position thereof.

4. Fluid operable brake control valve apparatus as claimed in claim 3 wherein the first pressure responsive device, whilst being subject on one side to said brake pipe pressure, is subject on the other side to pressure derived from a quick service bulb capacity.

5. Fluid operable brake control valve apparatus as claimed in claim 4, wherein the first pressure responsive device acts on the pressure responsive member via a movable quick service bulb inlet valve seat.

6. Fluid operable brake control valve apparatus as claimed in claim 1 wherein said resilient means is operable to offer a said predetermined force to the pressure responsive means against movement from the release equilibrium position, and including a spring which is compressible by a pressure responsive device which is subject to pressure derived from a quick service bulb capacity to hold the force of the latter spring removed from the pressure responsive member for movement into a brake applied position.

7. Fluid operable brake control apparatus as claimed in claim 1 wherein said resilient means exerts a said predetermined force on said pressure responsive means against movement from the lap equilibrium position toward a release position, said resilient means comprising a spring.

* * * * *